(12) United States Patent
Davis et al.

(10) Patent No.: US 9,974,147 B1
(45) Date of Patent: May 15, 2018

(54) INTEGRATED LED DRIVER FOR WIRELESS COMMUNICATION

(71) Applicant: Universal Lighting Technologies, Inc., Madison, AL (US)

(72) Inventors: Keith Davis, Madison, AL (US); John J. Dernovsek, Madison, AL (US); Stephen D. Mays, II, Madison, AL (US); Christopher Radzinski, Hunstville, AL (US); Wei Xiong, Madison, AL (US)

(73) Assignee: UNIVERSAL LIGHTING TECHNOLOGIES, INC., Madison, AL (US)

( * ) Notice: Subject to any disclaimer, the term of this patent is extended or adjusted under 35 U.S.C. 154(b) by 0 days. days.

(21) Appl. No.: 15/233,225

(22) Filed: Aug. 10, 2016

Related U.S. Application Data

(60) Provisional application No. 62/203,208, filed on Aug. 10, 2015.

(51) Int. Cl.
*H05B 37/00* (2006.01)
*H05B 37/02* (2006.01)
*H05B 33/08* (2006.01)
*H04W 4/00* (2018.01)

(52) U.S. Cl.
CPC ........ *H05B 37/0272* (2013.01); *H04W 4/008* (2013.01); *H05B 33/0815* (2013.01); *H05B 33/0845* (2013.01); *H05B 37/0227* (2013.01)

(58) Field of Classification Search
CPC ............ H05B 33/0854; H05B 37/0218; H05B 37/0227; H05B 37/0254; H05B 37/0272; Y02B 20/48
See application file for complete search history.

(56) References Cited

U.S. PATENT DOCUMENTS

2014/0028199 A1* 1/2014 Chemel .............. H05B 33/0854
315/152

* cited by examiner

*Primary Examiner* — Monica C King
(74) *Attorney, Agent, or Firm* — Patterson Intellectual Property Law, P.C.; Gary L. Montle

(57) ABSTRACT

A light fixture is provided or retrofitted with wireless LED lighting system requiring no additional wireless devices. An LED driver housing has power output terminals and control input terminals for an LED driver disposed therein. An LED lighting device includes driver input terminals to receive the output power from the LED driver, and to which an LED array and a wireless communication module are coupled to receive power therefrom. The wireless communication module comprises a transceiver configured to send and receive wireless communication signals with respect to an external device, and a controller linked to the transceiver and configured to generate lighting output control signals. Dimming control signals received via the transceiver may be processed by the controller and transmitted to the driver without requiring additional hardware or wiring within or attached to the driver. The lighting device also can wirelessly receive occupancy sensor data or LED configuration information.

9 Claims, 2 Drawing Sheets

INTEGRATED LED DRIVER FOR WIRELESS COMMUNICATION

CROSS-REFERENCES TO RELATED APPLICATIONS

This application claims benefit of U.S. Provisional Patent Application No. 62/203,208, filed Aug. 10, 2015, and which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

This invention relates generally to lighting control systems. More particularly, the present invention pertains to methods and systems for wireless programming of lighting devices with operating parameters.

Wireless control is very desirable, at least in part because the relevant control signals do not need any physical wiring configuration to reach the control unit. However, conventional wireless LED communication systems typically require the attachment and wiring of additional wireless communication modules inside of a lighting fixture to allow for wireless communications. Fluorescent ballasts or LED drivers are typically enclosed in a metal can, which may act like a signal shield that renders wireless communication impractical, if not nearly impossible. Further, magnetic components inside the LED driver housing can completely impede the near-field communication (NFC) process used to store and retrieve data wirelessly, for example by changing the impedance or resonant frequency of the system and disturbing the field set up by the NFC initiator (e.g., RFID reader) to communicate and receive data.

Therefore, these methods may generally require that an antenna be placed with an unobstructed view of external communication devices. This requirement necessitates modifying fixtures or providing wiring to an external antenna, particularly where new capabilities are desired for a retrofitted system.

It would be desirable to provide a lighting system that enables wireless communications without requiring additional external components or devices.

BRIEF SUMMARY OF THE INVENTION

Lighting systems and methods as disclosed herein will effectively solve the aforementioned existing problems for wireless lighting control, and further make the solution attractive in a practical sense.

In summary, the proposed wireless control technology minimizes wiring changes and simplifies the driver/receiver design for practical wireless control practice in a lighting system.

Integrating the LED driver and the LED light module for the purpose of wireless communications and integration offers several advantages.

In one aspect, by placing a communication module on the LED engine, there is the opportunity for an unshielded antenna. The communication module on the LED engine and powered by the LED driver then creates the ability to communicate with the LED driver.

In another aspect, integrating the wireless communications module with the LED engine eliminates the need to add additional modules and wiring within a lighting fixture to allow for wireless communication. Wireless communication circuitry and functionality as implemented directly on the LED module allows simple installation into a lighting fixture with no additional parts versus a non-wireless installation.

In another aspect, the wireless communications module integrated with the LED lighting module can add dimming capability to a retrofitted system without the need for additional wiring. Remote dimming is accordingly made possible via communications with smart phones, tablets, appropriately configured PCs and other communicating electronic devices.

In another aspect, LED module information can be stored on the communication module, along with information received from various sensors. Such stored information along with a controller for the wireless communications module may further enable the determination and communication of, e.g., lumen depreciation, environmental information, occupancy status, LED module configuration, and the like.

DETAILED DESCRIPTION OF THE INVENTION

Figure 1:
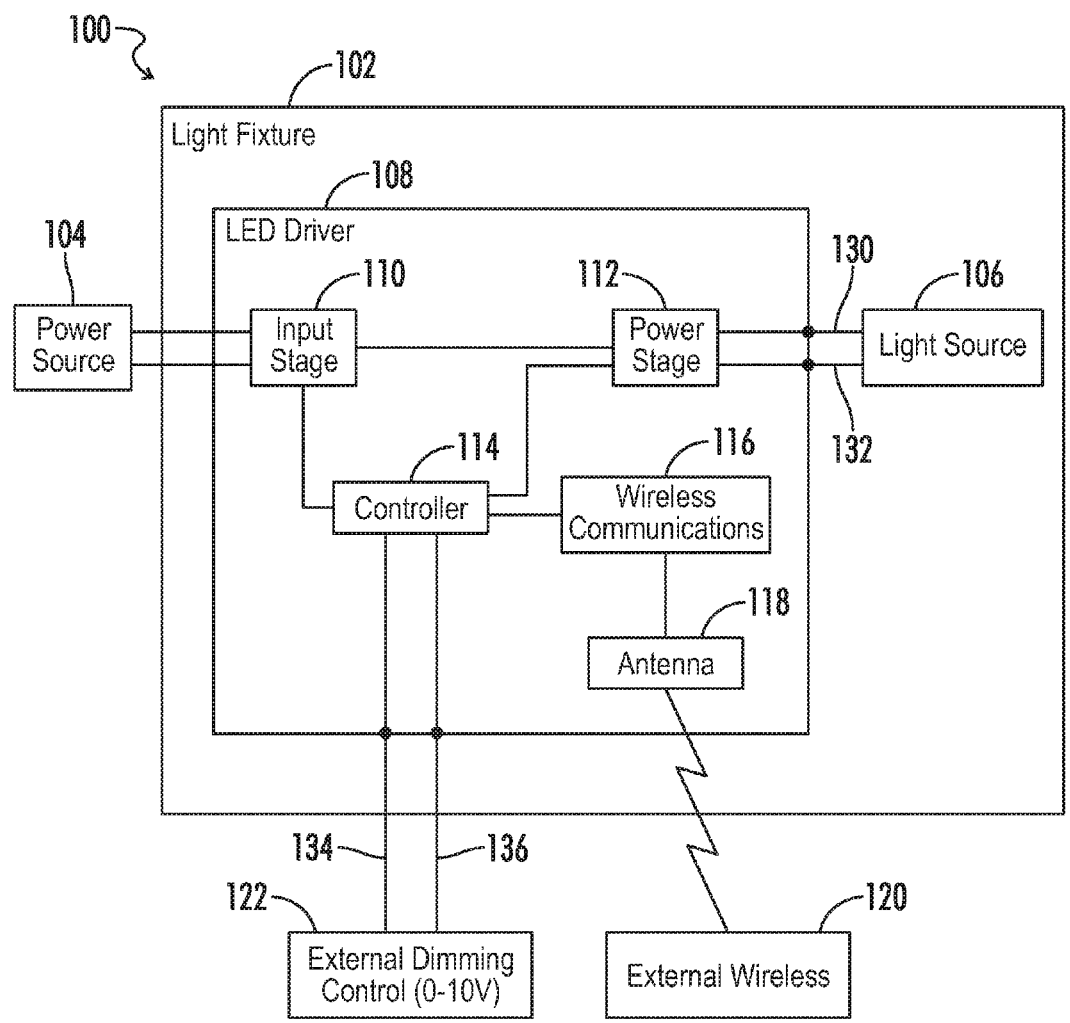
FIG. 1 is a circuit block diagram representing a conventional example of a lighting system having wireless functionality.

Referring generally to FIG. 1, a conventional example of a light fixture 100 is operable to receive power from a power source 104 and provides light as a function of an operating parameter. The light fixture 100 includes a light source 106, a light fixture housing 102, and a ballast. In the example shown and as described throughout, the light source 106 includes at least one light emitting diode (LED). The light source 106 provides light in response to receiving power. The light fixture housing 102 supports the light source 106 and the ballast, which in the present example may be referred to herein as an LED driver.

The LED driver receives power from the power source 104 and provides power to the light source 106 as a function of the operating parameter. In the example shown, the LED driver includes an LED driver housing 108, an input stage 110, an output stage 112, a controller 114, a wireless communication circuit 116, and an antenna 118. The input stage 110 receives power from the power source 104 and provides a direct current (DC) power rail. The power source 104 may be an alternating current (AC) power line (e.g., 115 V at 60 Hz) and the input stage 110 may be an AC to DC converter which may be implemented using a diode bridge rectifier and perhaps a power factor correction (PFC) circuit. Alternatively, the power source 104 may be a DC power source, and the input stage 110 simply a DC to DC converter.

The output stage 112 in the example shown provides power from the DC power rail to the light source 106 via leads 130, 132. The circuit topology of the output stage 112 varies as a function of the light source 106. That is, if the light source 106 is an LED as with the present example, then the output stage 112 may be a current controlled DC to DC converter, and if the light source 106 is a fluorescent lamp, then the output stage 112 may be a power controlled DC to AC inverter.

The LED driver controller 114 operates the output stage 112 as a function of a dimming signal provided from an external dimming controller 122 via leads 134, 136. The dimming signal is indicative of an intended brightness level of the light source 106. In one example, the dimming controller 122 provides an analog control signal that varies between 0 and 10 V to determine the dimming signal provided to the controller 114, either directly or via dimming interface circuitry associated with the LED driver.

In the example shown, the LED driver housing 108 substantially encloses the input stage 110, the output stage 112, the controller 114, the wireless communication circuit 116 and the antenna 118. However, in other known examples the wireless communication components may be external to the light fixture housing 102.

Figure 2:
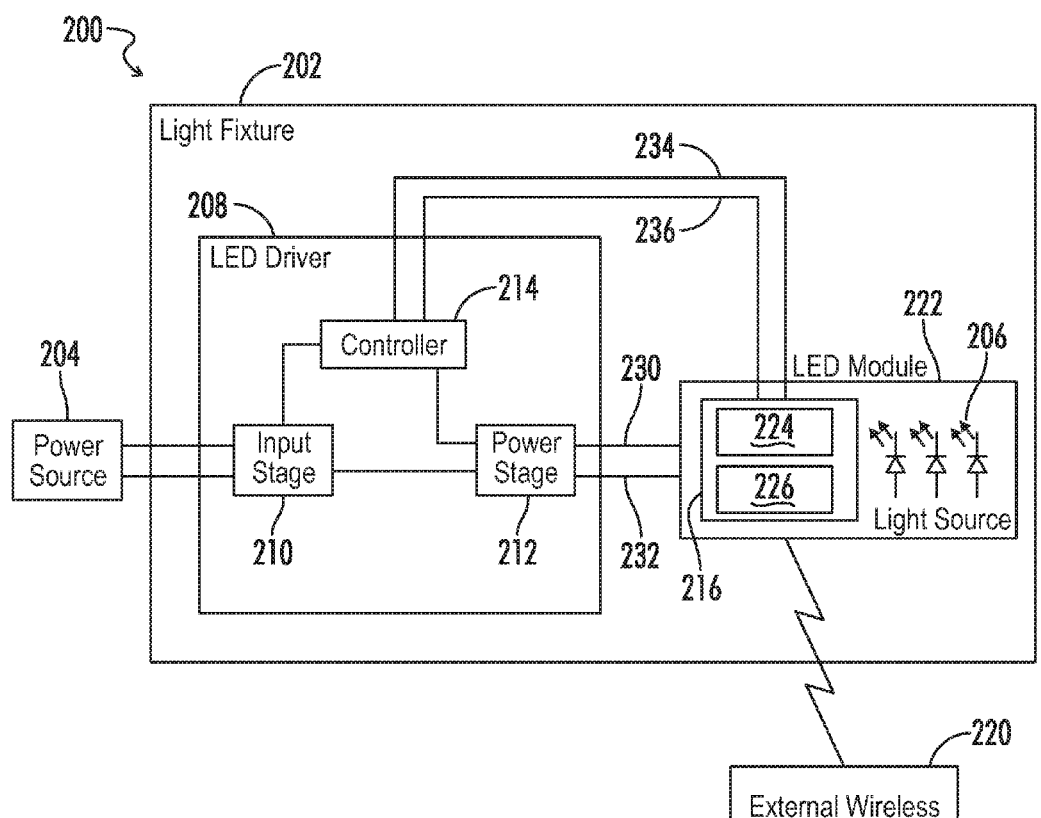
FIG. 2 is a circuit block diagram representing an embodiment of a lighting system according to the present disclosure, having wireless functionality integrated with an LED lighting module.

Referring now to an embodiment of a light fixture 200 as provided herein and with reference to FIG. 2, an LED driver may be mounted within a light fixture housing 202 and coupled to receive input power from power source 204. As before, the LED driver includes a housing 208 having an input stage 210, a power stage 212 and a controller 214 disposed therein, but without the wireless communications circuitry and components.

An LED lighting device 222 is positioned within the light fixture 202 and includes a wireless communication module 226 and a light source 206 (i.e., one or more LEDs). The lighting device 222 receives input power from the LED driver 208 via input power leads 230, 232. The wireless communication module 216 may in an embodiment be disposed on a printed circuit board and including a controller 224 and a wireless communication device such as a transceiver 226 configured for one or more protocols including WiFi, Bluetooth, Zigbee and the like. One of skill in the art may appreciate that in various embodiments and depending on the desired configuration the wireless communication module may further include signal amplification circuitry, interface circuitry and the like.

The controller 224 for the lighting device 222 is linked to the controller 214 for the LED driver 208 via third and fourth leads 234, 236 and various intermediate components or circuits as needed (not shown). The transceiver 226 is linked to an external wireless device 220. In various embodiments an antenna may be coupled to the wireless communication module 226 or otherwise provided in association with the LED module 222 for linking the transceiver to the external device. In an embodiment an antenna may alternatively be integrated with the printed circuit board of the wireless communication module 216.

In an embodiment, the transceiver 226 receives wireless dimming control signals from the external device 220, which are processed by the controller 224 for the wireless communication module 216. The controller 224 generates lighting output control signals corresponding to a desired lighting output from the dimming control signals, and transmits these signals to the controller 214 for the LED driver via leads 234, 236. The power stage 212 for the LED driver, which may typically be a switched mode power converter, may be regulated in operation to provide an output power corresponding to the desired lighting output, such as for example by modulating an operating frequency of the associated switching elements. Accordingly, remote dimming control is made available for the light fixture 202 via mobile electronic devices or other wireless user communications devices 220 without requiring additional wiring or hardware with respect to the LED driver, and without potentially compromising the signal by transmitting through the metal can housing for the LED driver.

In an embodiment, the transceiver 226 receives wireless environmental input signals from any of one or more environmental sensors as may be associated with the lighting device 222. The controller 224 receives the wireless input signals and may further determine an environmental condition associated with the lighting device 222, wherein the transceiver is implemented to wirelessly transmit environmental data corresponding to the environmental condition to the external device, such as for example on demand or as part of a periodic or continuous message broadcast.

In an embodiment, one or more of the environmental sensors may be occupancy sensors (i.e., directly or via intermediate gateways, networks and the like), such as for example passive infrared (PIR) detectors, sound detectors, light detectors, temperature sensors, ultrasonic sensors, and the like. Dual technology occupancy sensors may preferably be implemented to reduce false tripping, implementing an active sensing method in combination with a PIR element. Input signals from such sensors may be received via the transceiver 226 and further processed by the controller 224 to determine an occupancy status for a defined area associated with the lighting device 222. The transceiver 226 may be implemented to wirelessly transmit data corresponding to the occupancy status to the external device, such as for example on demand (i.e., changes in status) or as part of a periodic or continuous message broadcast. The controller 224 may further be configured to generate dimming control signals to the LED driver controller 214 for dimming levels corresponding in a predetermined level to a particular occupancy status. Again, remote transmission of such signals is made available for the light fixture 202 via the occupancy sensors without requiring additional wiring or hardware with respect to the LED driver, and without potentially compromising the signal by transmitting through the metal can housing for the LED driver.

In an embodiment, the controller 224 for the LED module 222 is configured to receive and store LED configuration information associated with an input power required to generate the desired lighting output, wherein the wireless communication module 216 is configured to transmit signals corresponding to a stored LED module configuration to the LED driver controller 214 and/or an external device 220 as desired. The LED configuration information may include for example a number of LEDs coupled in series and/or in parallel with respect to the first and second input terminals.

In one embodiment, the lighting device 222 may include a plurality of lighting elements (e.g., LEDs) arranged in series along the face of an elongated substrate. The lighting device 222 having an integrated wireless communication module 216 as disclosed herein may in such an embodiment be coupled in series with similar LED modules as previously known in the art and lacking the integrated wireless communication module. A plurality of such LED modules may themselves be coupled in series with each other, with a first module being coupled directly to the LED driver via a first lead 230, and a last module being coupled directly to the LED driver via a second lead 232, and various additional leads (not shown) being implemented to couple opposing ends of the series-connected LED modules to each other. In such an embodiment, the wireless communication module 216 may for example be wirelessly provided with LED configuration information corresponding to the number of LED modules coupled in series.

In an embodiment, the transceiver 226 may further be configured to receive wireless input signals from one or more lighting output sensors (i.e., directly or via intermediate gateways, networks and the like), wherein the controller 224 may be configured to store corresponding lighting output information over time. The controller 224 may further determine a lighting depreciation status for the lighting device 222 corresponding to changes over time in lighting output relative to the input power. The transceiver 226 may be implemented to wirelessly transmit data corresponding to the lighting depreciation status to the external device 220, such as for example on demand (i.e., changes in status) or as part of a periodic or continuous message broadcast.

An improved method may follow for retrofitting a light fixture for wireless communication, in accordance with an integrated LED system as disclosed herein. An exemplary and existing light fixture may be assumed to have a lighting system including a power supply and a lighting device, such as for example a ballast for driving a fluorescent lamp or an LED driver for driving an LED array. In one example wherein the lighting device is a fluorescent lamp, the retrofit method may typically involve removing both of the ballast and the lighting device. In another example wherein the lighting device is an LED module, the LED driver may be replaced or maintained depending on the configuration. For example, the existing LED driver should have input terminals corresponding to the dimming control input lead pairs 134, 136 or 234, 236 as described above, or otherwise the LED driver may preferably be replaced as well.

The method continues wherein a lighting device 222 including an embodiment of an integrated wireless communication module 216 as disclosed herein is mounted in the light fixture housing 202. First and second leads 230, 232 corresponding to respective power output terminals for the LED driver are coupled to respective power terminals for the lighting device 222, and third and fourth leads 234, 236 corresponding to control input terminals for the LED driver are coupled to the respective control output terminals for the controller 224 of the wireless communication module 216 in the lighting device 222.

In an embodiment, the method may further involve retrofitting an existing light fixture for wireless dimming functionality, wherein upon installing the lighting device 222 with integrated wireless communication module 216, an external device 220 may be implemented to wirelessly transmit a dimming control signal to the wireless communication module 216. The wireless communication module is configured as previously described to determine a desired lighting output from the dimming control signals and transmit lighting output control signals corresponding to the desired lighting output to the controller 214 of the LED driver 208.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function. Terms such as "wire," "wiring," "line," "signal," "conductor," "lead," and "bus" may be used to refer to any known structure, construction, arrangement, technique, method and/or process for physically transferring a signal from one point in a circuit to another.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. An exemplary computer-readable medium, such as for example RAM memory, flash memory, ROM memory, EPROM memory, EEPROM memory or the like, can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:
1. An LED lighting device comprising:
first and second input terminals configured to receive input power from an LED driver when coupled thereto;
one or more light emitting diodes (LEDs) coupled in series across the first and second input terminals and configured to generate a lighting output corresponding to the input power;
a wireless communication module coupled to the first and second input terminals to receive input power therefrom, the wireless communication module comprising a transceiver configured to send and receive wireless communication signals with respect to an external device, and a controller linked to the transceiver and configured to generate lighting output control signals; and first and second output terminals configured to transmit the lighting output control signals to the LED driver when coupled thereto.

2. The LED lighting device of claim 1, wherein the transceiver is configured to receive dimming control signals from the external device, and wherein the controller is configured to generate lighting output control signals corresponding to a desired lighting output from the dimming control signals.

3. The LED lighting device of claim 2, wherein the controller is further configured to receive wireless input signals via the transceiver from one or more environmental sensors and determine an environmental condition associated with the lighting device, and wherein the transceiver is configured to transmit to the remote device environmental data corresponding to the environmental condition.

4. The LED lighting device of claim 3, wherein one or more of the environmental sensors are occupancy sensors from a group comprising passive infrared detectors and sound detectors, and the controller is configured to determine an occupancy state with respect to the lighting device based at least in part on the input signals from the occupancy sensors.

5. The LED lighting device of claim 2, wherein the controller is configured to receive and store LED configuration information associated with an input power required to generate the desired lighting output, and wherein the wireless communication module is configured to transmit signals corresponding to a stored LED module configuration to an LED driver controller when coupled thereto and to the external device.

6. The LED lighting device of claim 5, wherein the LED configuration information comprises one or more parameters from a group comprising a number of LEDs coupled in series and a number of LEDs coupled in parallel with respect to the first and second input terminals.

7. The LED lighting device of claim 5, wherein the controller is configured to receive input signals from one or more lighting output sensors and store corresponding lighting output information over time, and wherein the transceiver is configured to transmit to the remote device a lighting depreciation status corresponding to changes over time in lighting output relative to the input power.

8. The LED lighting device of claim 1, further comprising an antenna coupled to the transceiver of the wireless communication module.

9. The LED lighting device of claim 1, further comprising an antenna integral with respect to the wireless communication module.

* * * * *